United States Patent [19]

Lee et al.

[11] Patent Number: 4,843,632
[45] Date of Patent: Jun. 27, 1989

[54] COMPRESSED IMAGE EXPANSION SYSTEM

[75] Inventors: Jeffery H. Lee, Cupertiono; Yee S. Chin, San Jose, both of Calif.

[73] Assignee: Prodigy Systems Corporation, Mountain View, Calif.

[21] Appl. No.: 861,500

[22] Filed: May 9, 1986

[51] Int. Cl.[4] .................. G06K 9/36; H04N 1/419
[52] U.S. Cl. .................. 382/56; 358/261.1; 358/262; 358/427
[58] Field of Search .................. 382/56; 358/261, 262

[56] References Cited

U.S. PATENT DOCUMENTS

| | | | |
|---|---|---|---|
| 3,474,442 | 10/1969 | Centanni | 358/261 |
| 4,302,775 | 11/1981 | Widergren et al. | 382/56 |
| 4,571,634 | 2/1986 | Caneschi et al. | 358/261 |
| 4,602,383 | 7/1986 | Ogawa et al. | 358/261 |

Primary Examiner—James J. Groody
Assistant Examiner—Michael D. Parker
Attorney, Agent, or Firm—Irell & Manella

[57] ABSTRACT

There is disclosed herein a system for expanding a compressed image stored in memory as one and two dimensional huffman codes into an image comprised of pixel data corresponding the orginal colors and positons of pixels in the original, uncompressed image. The system is comprised of a four stage, data driven pipeline where each stage works in parallel with the other stages. The first stage contends for read cycles to access the codes, stores the codes so accessed and converts the words of code bits so accessed into individual codes for application to the second stage. The second stage converts the incoming codes into their corresponding run lengths by looking each code up in a look up table. The table stores data which is either the run length itself for one dimensional codes or is data from which the run length may be calculated by reference to the previous raster line. The third stage converts the run lengths into strings of pixel data of the proper length and pixel color. The fourth stage converts these strings of pixels into words suitable for writing into a raster frame memory.

19 Claims, 2 Drawing Sheets

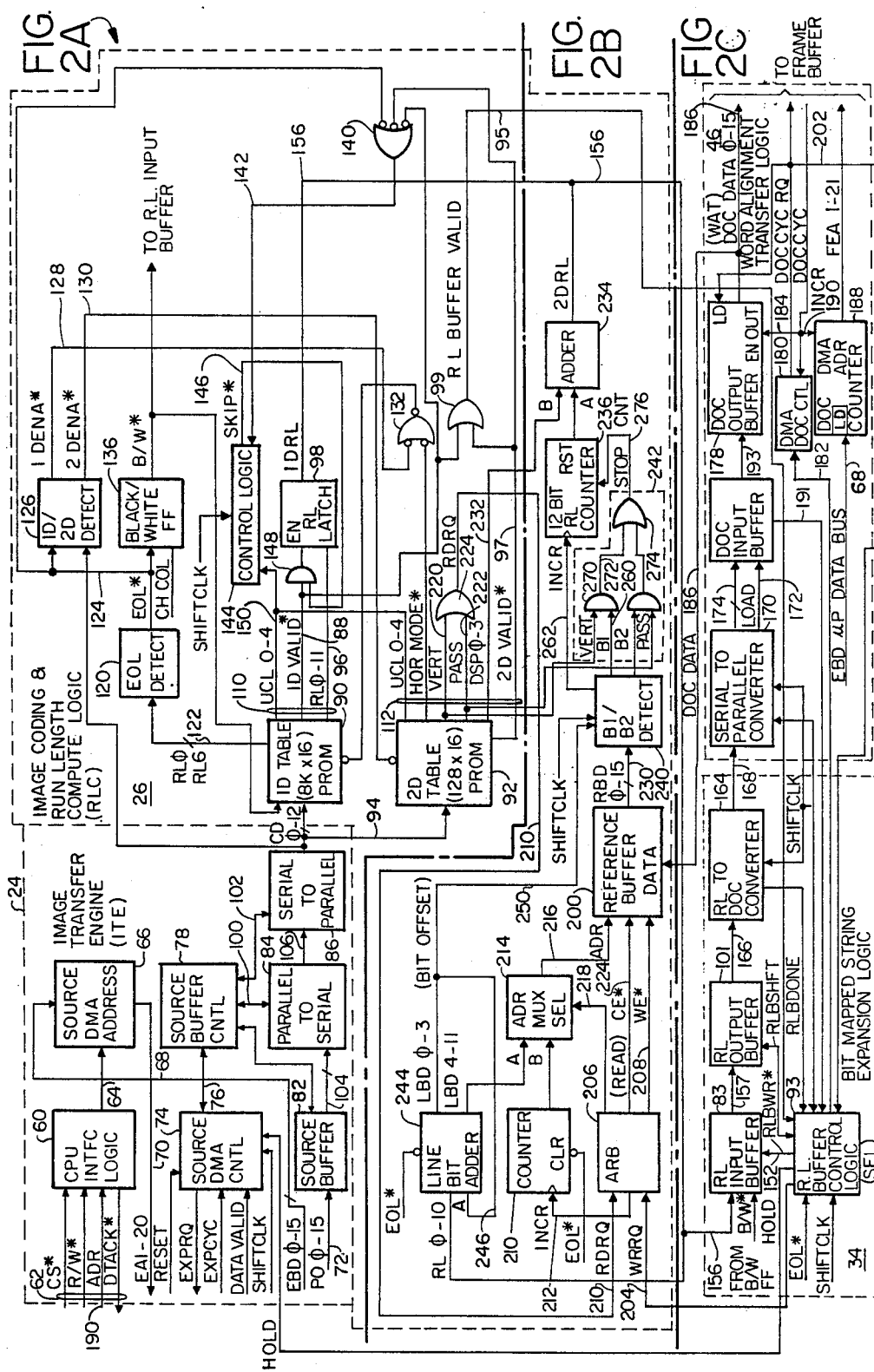

COMPRESSED IMAGE EXPANSION SYSTEM

BACKGROUND OF THE INVENTION

The invention pertains to the field of electronic document storage and recovery systems, and, more particularly, to the field of compressed image expanders used in such systems.

With the growing volume of documentation in the business community, the space taken up by millions of documents and the labor of retrieving them are becoming non-trivial expenses. In an effort to more efficiently deal with such large volumes of documents, electronic document storage and retrieval systems have been and are being developed. The object of these systems is to electronically scan a document into a bit mapped image stored in a frame buffer. Compressing circuitry then compresses the document image to reduce the amount of data that must be stored. When the document is to be retrieved for display or printing, the compressed data is retrieved and expanded by a compressed image expansion system.

Such image expansion systems must be able to efficiently and rapidly handle large quantities of data since images contain huge volumes of data. Further, such systems must be flexible enough to rapidly large quantities of data which is totally unpredictable in its format. Several stages in the expansion or decoding process must occur. Usually, one function cannot occur until the preceding function has occurred. Since each document image may be different and unpredictable, it is impossible to predict how long each stage will need to complete its task. Problems in system operational speed will occur if such a data environment causes the image expansion system to bog down in terms of the speed with which an image is expanded from its compressed form. Thus a need has arisen for an compressed image expansion system which can rapidly handle large volumes of data in whatever format it arrives.

SUMMARY OF THE INVENTION

Brief Description of the Drawings*

FIGS. 2A, 2B and 2C are a detailed block diagram of the preferred embodiment of the invention.

Detailed Description of the Preferred Embodiment

Figure 1:
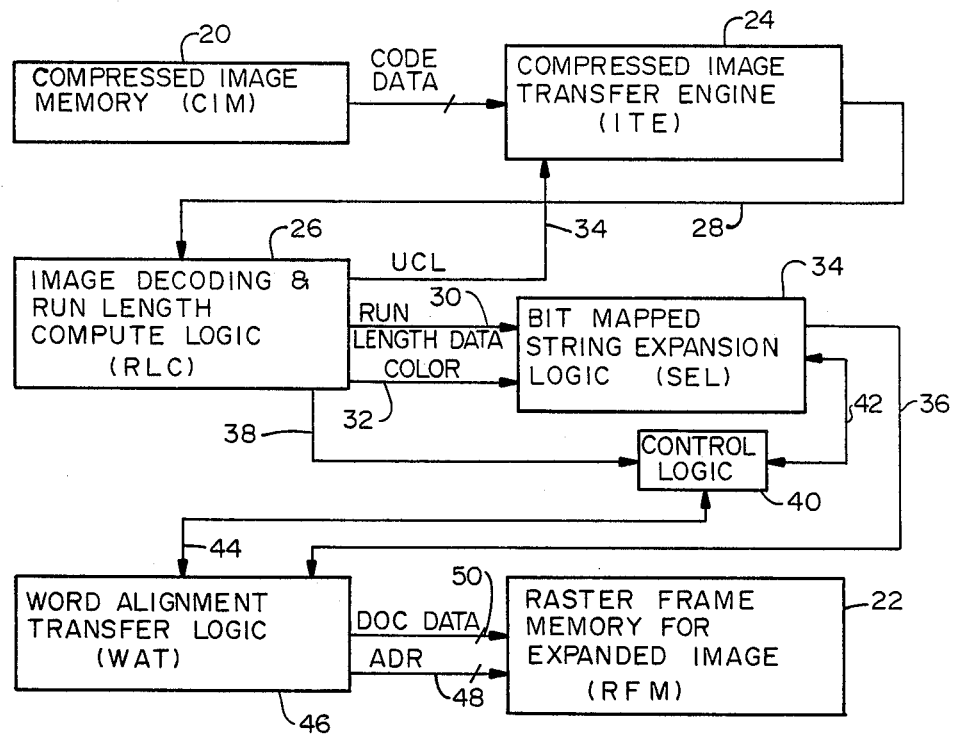
FIG. 1 is block diagram of the image expansion system of the invention.

Referring to FIG. 1, there is shown a block diagram of the image expansion system of the invention. FIG. 1 shows a compressed image memory (hereafter CIM) which stores the image in its compressed form and a raster frame memory for the expanded image 22 (hereafter RFM) for storing the expanded version of the image for display or printout. The stages of the expansion system between these two memories 20 and 22 are shown in the form of the stages of a pipeline, each of which does a particular function in the process of expanding the codes stored in the CIM 20 into the actual bit mapped pixel data stored in the RFM 22. Each of the stages of the pipeline does its function independently of the operations being performed in the other stages in the sense that the system is data driven rather than being controlled synchronously from a centralized control processor or state machine. That is to say that there are handshaking or protocol signals that pass between the stages that indicate to succeeding stages when data is ready for transfer from the preceding stage or when the succeeding stage when the stage is ready to receive new data.

In the preferred embodiment, the CIM 20 receives the code data indicating the pixel content of the lines in the original image from a network controller board such as an Ethernet TM controller which receives it from a storage device such as an optical disk. The expander system is typically in a work station on an Ethernet system with a microprocessor controlling the operations of the work station. The microprocessor (not shown) will control the network controller (also not shown) and cause it to load the pixel data codes being received from the optical disk or other source on the network into the CIM 20 by DMA. The manner in which the codes are loaded into the CIM 20 is not critical to the invention, and any system which will do this loading operation will suffice for purposes of practicing the invention.

In the preferred embodiment, the known Huffman coding algorithm specified in CCITT Facsimile VII.2-Rec. T.4 is used to compress the original image and generate the code data which is loaded into the CIM 20. This coding algorithm will be explained in more detail below with reference to further discussion of decoding circuitry. In other embodiments, other coding algorithms may be used and the decoding circuitry necessary to decode the particular codes generated by the selected algorithm will be substituted for the decoding stage in the pipelined architecture of the expander.

The first stage of the expander is a compressed image transfer engine (hereafter ITE). This stage functions to contend with the network controller for access to the CIM 20 and to access the code data in the CIM. The code data is read into buffers in the ITE 24 and reformatted into the proper format for input to the second stage of the pipeline.

The second stage is an image decoding and run length compute logic circuit 26 (hereafter RLC). The purpose of the RLC is to convert from the code data arriving on the bus 28 from code data to run length data which indicates for particular lines to which the code data applies the number of consecutive pixels of the same color on the corresponding line to be stored in the RFM 22. Each incoming Huffman code corresponds to one run length. The data regarding the size of each run is output by the RLC on a bus 30 which is coupled to the next stage. The RLC also generates a B/W* signal on a line 32 which indicates to the third stage what color pixels, e.g., black or white, to generate for the run length indicated by the data on the bus 30. The RLC 26 also communicates with the compressed image transfer engine 24 via a control bus 34 to control the transfer of data between the ITE and the RLC. The basic function of the protocol signals passing between the RLC 26 and the ITE 24 is to control the data flow between the ITE and the RLC. In the preferred embodiment, the ITE accesses data from the CIM in 16 bit parallel bytes. However the codes on bus 28 are variable in length, and the longest code is 13 bits long. Since these codes may cross word boundaries, and because each must be applied as an entity to the RLC 26 for decoding, the ITE must break down the incoming words into their various code components. However, since the ITE, does not know how long each incoming code is, it must be told this information by the RLC 26 after the RLC has recognized a valid code and determined its length. The length of the code is then transmitted back on bus 34 as the UCL signal to tell the ITE where the next valid code boundary is located.

To break down the incoming words into their codes, the ITE, in the preferred embodiment, converts the parallel format words into a serial bit stream and shifts them bit by bit into a serial to parallel converter which has its parallel output coupled to the code input of the RLC. The RLC is a look up table in the preferred embodiment, and has an output signal, 1DVALID, which is activated when a valid code is recognized. Other outputs of the table indicate the run length corresponding the code which was recognized. When this 1DVALID signal is active, the outputs on the bus 34 are a valid indication of how many more bits must be shifted into the serial to parallel converter before the next code boundary is reached. Further, this signal is used to indicate when the output of the look up table is a valid run length.

The ITE is designed to be pipelined in that an input buffer is used to store incoming words to be broken into the corresponding codes for the RLC by the parallel to serial and serial to parallel to serial converters. This allows arbitration for and access to the CIM 20 to be happening simultaneously with conversion of other previously read data (stored in the buffer of the ITE) to the proper code boundaries for transmission to the RLC.

The RLC 26 functions to convert the codes coming in on bus 28 to their corresponding run lengths for output on the bus 30. The specific design of the RLC depends upon the particular coding scheme used. In the preferred embodiment, the RLC is a look up table for one dimensional Huffman codes and another look up table for two dimensional Huffman codes. Each table has separate, unique code conversion data to convert black run length codes to their corresponding run length of black pixels and to convert white run length codes to their corresponding run lengths of white pixels.

The run length data on bus 30 and the color data on bus 32 are transmitted to the third stage of the pipeline which is the bit mapped string expansion logic 34 (hereafter SEL). The SEL serves to convert the run length data on bus 30 to a serial stream of pixel data of the proper color and run length for output on bus 36 to the fourth stage of the pipeline. The SEL is pipelined in that it has two 11 bit buffers for storing run length codes. The first of these two buffer is used to receive a first run length code. This run length code is then shifted into the second buffer and there is transmitted to the fourth stage of the pipeline when the fourth stage is ready to receive it. When the second buffer has loaded the run length code, it is available to receive another run length code on the bus 30 while the first run length code then resident in the second buffer is being converted to the corresponding string of pixels. The SEL 34 is continuously supplied with the run length data on the bus 30, but this data is only valid at times when the RLC recognizes a valid code at its input on bus 28. This event is signalled by a signal on the control bus 38 which carries protocol signals for data exchange between the SEL 34 and the RLC 26 to control logic 40. The control logic 40 is coupled to the SEL 34 by control bus 42 and is coupled to the fourth pipeline stage by the control bus 44. The control logic 40 serves to generate the signals needed to load the new run length data in the first buffer, and to cause the contents of the first buffer to be shifted to the second buffer in the SEL and to control the operation of the pipeline fourth stage. More details will be given on this control function below. The fundamental action of the control logic 40 is to monitor the flag signals indicating when each stage of the pipeline (and the internal stages in the pipeline stages) are done performing their functions or have valid data to send to the next stage and to cause the data flow between stages to be coordinated based upon these flag signals.

The fourth stage of the pipeline is the word alignment transfer logic 46 (hereafter WAT). This stage operates on the serial bit stream of pixel data generated by the SEL by expanding the run length codes on the bus 30 and the color signal on the line 32 into a stream of pixel runs of the proper colors and lengths on the bus 36. The WAT 46 receives the pixel data stream and shifts it into a buffer. Every 16 bits, the WAT requests a write bus cycle for purposes of writing the 16 bit word into a raster frame memory for the expanded image 22 (RFM). The WAT must contend for the RFM with the CRT controller (not shown) or printer peripherals (not shown) which display or generate hard copy of the image in the RFM. When a bus cycle is granted, the WAT generates the proper address on the address bus 48 of the RFM and writes the word then in its output buffer into the RFM. The WAT uses a serial-in-parallel-out shift register which receives shifts in the serial bit stream from the SEL and outputs a 16 bit word to the buffers of the WAT when 16 bits have been received. The WAT uses two buffers in the preferred embodiment. The first buffer is used to receive data from the serial-in-parallel-out shift register, and store it temporarily until the second buffer has been granted a bus cycle and has loaded its contents on a doc data bus 50 coupled to the data port of the RFM.

Referring to FIGS. 2A, 2B and 2C, there is shown a more detailed block diagram of the system of the invention. The sections of logic which correspond to the stages of the pipeline in FIG. 1 are outlined in dashed lines with the same reference numerals applied as were used in FIG. 1. The image transfer engine 24 is comprised of CPU interface logic which exchanges control signals on a control bus 62 with the CPU (not shown) and which generates control signals on a bus 64 to control a source DMA address generator 66. The DMA address generator 66, when enabled by the CPU and instructed to receive data, receives a starting address on a bus 68 from which to begin reading data from the compressed image memory 20 (not shown). The address generator then begins generating addresses on a bus 70 which is coupled to the address port of the CIM 20. These address signals cause the Huffman codes stored in the CIM 20 to be output by the CIM 20 on a PO data bus 72. A source DMA control logic circuit 74 contends for read bus cycles for the CIM by asserting the signal EXPRQ to the CIM arbitration logic (not shown). Such arbitration logic is well known and will not be detailed here. When a cycle is granted, the EXPCYC signal is activated by the arbitration logic, and when the output data on the PO bus is valid, the DATAVALID signal from the arbitration logic is activated. The CPU also has access to several other registers which are not shown and which are not critical to the understanding of the invention. A command and status register stores status bits such as "expansion done" and "error". Typically, errors can occur when the incoming code is not valid or the line width of the expanded line does not equal the predetermined width. There is also a page width register which the microprocessor loads with a number which indicates the number of pixels across the page. There is also a source DMA count register which is loaded with data indicating the size of a packet.

A typical sequence of operation for the work station CPU containing the expansion subsystem of the invention is to receive the image from the network, check it for errors, strip off the headers containing station addressing information, and then set up the expansion system to expand the received image. The CPU will transmit the source address, the size of the packet in the DMA count register, and the starting address for the source DMA operation. The CPU will then set up the address in the RFM where the first word in the expanded data is to be stored, and then the expansion will be started by the activation of a start signal (not shown). Typically this a a start bit in the command/status register. This will cause the ITE to begin contending for read cycles to get code data out of the CIM 20. When the expansion is done, the expander system generates an interrupt. The CPU then checks a bit in the command/status register to see if the expansion was successful or if there was an error. The CPU is then ready to reset the expander system counters to zero and set up the expander system for the next image. The operations of the CPU in performing the above functions are not critical to the invention.

The first stage of the expansion pipeline is controlled by the source DMA control logic 74 and source buffer control logic 78, these two circuits being coupled by a bus 76 carrying control signals. The function of this logic 74/78 is to control the data transfer into the ITE and between the stages of the ITE such that new data is not written over old data before the old data has been passed on the next stage. The stages of the ITE are a two stage source buffer 82 to receive the incoming data and store it temporarily for conversion by a parallel to serial converter 84 and a serial to parallel converter 86 into a format useable by the RLC 26. This conversion is necessary because the Huffman codes are of variable length with a maximum length of 13 bits whereas the words coming in from the CIM are 16 bits. A word may then contain one Huffman code and part of another or may contain several Huffman codes none of which end on word boundaries. By converting the parallel format words to serial format, the parallel to serial converter 84 allows the serial to parallel converter 86 to shift in the bits of the incoming words one bit at a time and apply the resultant parallel combinations to the address inputs of look up tables 90 and 92 in the RLC. These look up tables contain the data which define the run lengths for each valid Huffman code. When a valid Huffman code appears on the address lines CD 0-12, bus 94, the 1D look up table then indicates this fact by activating the 1DVALID signal on line 88. This signal along with a SKIP signal to be explained later, is used to latch a run length data word on a bus 96 from the 1D look up table 90 into a run length latch 98 for temporary storage.

The look up tables decode the Huffman code address on the bus 94 every time a new code appears on the bus 94, i.e., every shift clock time. The code may or may not be a valid code depending upon whether the most significant bit of the next code entering the serial to parallel converter 86 has reached the most significant bit position in the converter 86. The run length data emerging on the bus 96 from the 1D look up table is not latched in the run length latch 98 however until the 1DVALID signal is activated.

The source DMA control logic 74 and the source buffer control logic 78 combine to coordinate the activities of the first stage of the pipeline as follows. When the DATAVALID signal from the arbitration logic is activated, data on the PO bus from the CIM is valid. At this time logic 74/78 causes the source buffer 82 to clock the data on the PO bus 72 into the source buffer 82. In some embodiments, the source buffer has two 16 bit registers which are controlled in pipeline fashion, but in the preferred embodiment, only one 16 bit latch is used. The output of the source buffer 82 is continuously enabled and the parallel 16 bits of incoming code data is loaded in the parallel to serial converter 84 under certain conditions. Those conditions are that the HOLD input signal to the source DMA control logic 74 indicates that the data in a run length buffer 83 in the SEL 34 has been expanded, and the run length buffer 83 is ready to receive more run length codes. When HOLD is inactive (low), the SHFTCLK signal is gated through the source DMA control 74 and the source buffer control 78 and is passed on control lines 100 and 102 to the parallel to serial converter 84 and to the serial to parallel converter 86. The SHIFTCLK signal causes the parallel to serial converter 84 to begin shifting the 16 bits of data stored therein loaded from the source buffer 82 via a bus 104 to be shifted out in serial format on a bus 106. The HOLD signal is generated by run length buffer control logic 93 in SEL 34 from in internal signal indicating whether the run length buffer 83 is full and from a RL BUFFER VALID signal on a line 95. This RL BUFFER VALID signal is active when either of the 1D or 2D tables 90 or 92 recognizes a valid Huffman code on the address bus 94 and activates either the 1DVALID or 2DVALID signals on the lines 88 or 97 respectively. An or gate 99 combines the two signals and generates the RL BUFFER VALID signal. The HOLD signal is activated by the run length buffer control logic 93 when the RL BUFFER VALID signal is active, the SKIP signal is not active, and the NOT FULL signal (not shown because it is internal to the control logic 93) is active indicating the run length input buffer 83 is available to receive a new run length. The NOT FULL signal indicates whether the contents of the first stage of the run length input buffer 83 have been shifted to a run length output buffer 101 to await expansion thereby making the run length input buffer 83 available for receiving a new run length.

The serial data on the bus 106 is shifted into the serial to parallel converter 86 one bit at a time. The output of the serial to parallel converter 86 is the CD data bus which couples the incoming code data to the address inputs of the 1D and 2D look up tables 90 and 92.

The 1D and 2D look up tables continuously decode the bits on the CD bus and provide outputs at their data ports 110 and 112 respectively. These outputs are multi-bit and are separated into various buses each of which contains data to be used for a specific purpose. The look up tables 90 and 92 each contain data from which the run length can be determined. The 1D table 90 contains actual run lengths which correspond to each incoming Huffman code in the one dimensional coding format. There is a separate Huffman one dimensional code for each black pixel run length and for each white pixel run length, and this data is organized into two tables within the table 90.

The Huffman one dimensional code is well known. but for completeness here, each black and white run length from 0 to 63 has a unique "terminating code".

For run lengths greater than 64 bits, the run length is comprised of a "make up" code for a base number, e.g., 64, 128, 192, 256 etc., plus a concatenated terminating code for the difference between the base number run length and the actual run length. Thus the code for a black run length of 70 would be the base number run length for a black run of 64 concatenated with the terminating code for a black run of 7.

The 2D look up table contains data corresponding to each Huffman two dimensional code. The coding scheme for two dimensional Huffman coding is based upon the previous line. Two dimensional coding is done in three modes. A horizontal mode of coding is the same as one dimensional coding. A vertical mode of coding uses codes which indicate the positions of changes of color on the current line relative the changes of color on the reference line. This mode is used when the reference line changes color only once before the current line changes color. A pass mode also indicates by its code values the positions of changes of colors on the current line by the positions of the changes of color on the reference line. This mode of coding is used when the reference line changes color twice before the current line changes color once. The vertical codes indicate a displacement in bit positions either left or right for the color change on the current line relative the first change in color on the reference line. The pass mode codes indicate the position of the second change in color of the reference line and indicate that the current line has not yet changed color as of that position.

The expander system requires that at least the first line of the compressed image have been coded in one dimensional code so as to serve as a reference line for subsequent lines coded in two dimensional code. It is good practice to code other lines in the image with one dimension codes however to stop the propagation of errors.

With one dimensional coding there is no need to know to which lines the codes apply or where the end of the line is found. However, with two dimensional codes it is necessary to know which codes apply to which lines because the codes define each line's contents relative to the previous line's contents. Thus some circuitry is needed to detect the end of each line. Each line which is coded in two dimension Huffman code has an end of line code written in the code at the end of the line. Typically this will be an invalid Huffman code, which can be recognized by decoding circuitry. In the preferred embodiment, the end of line code is such the output lines RL 0 and R1 6 both become active whereas in no other Huffman code is this true. This condition is detected by an end of line detecting circuit 120 which is coupled to bits 0 and 6 of the run length output bus 96 from the 1D look up table 90 by a bus 122. The detector 120 activates an EOL* (* means active low) signal on a line 124. This signal is coupled to a 1D/2D detect circuit 126 and enables it. The bit following the end of line code in the compressed image code stream indicates whether the next line is coded one with one dimension or two dimension code. When EOL* is active, the detector 126 reads the appropriate bit from the CD bus 94 and activates either the 1DENA* or 2DENA* signal. These signals on the lines 128 and 130 respectively are used to enable the appropriate one of the 1D or 2D look up tables to begin looking at the incoming codes on the CD bus 94. The 1DENA* signal is combined with a HOR MODE* signal from the output of the 2D table in an inverted input or gate 132 to enable the 1D table.

The 2D look up table activates the HOR MODE* signal when a two dimensional code indicating a horizontal mode appears on its input since such a code must be decoded in the same manner as a one dimensional code.

To properly keep track of the colors of the runs in the current line, a convention is established that each line will be coded with such that each line starts out with a white run length code even if the first pixel in the line is black. In such a circumstance, the white run length code will be of run length 0. This convention is adopted so that a black/white flip flop 136 may be toggled at each color change and will thus provide a B/W* signal which indicates the color of each run length. The EOL* signal is coupled to this flip flop to reset it to a white condition of the signal B/W* at the beginning of every line. The flip flop 136 is toggled by a CH COLOR signal which is generated by logic (not shown) coupled to the RL BUFFER VALID signal such that each time either the 1D or the 2D table detects a valid code, the black/white flip flop is toggled. The B/W* signal is also coupled to the input of the 1D look up table 90 as an address signal since separate codes are assigned to black runs and to white runs and these codes are assigned to separate areas of the table.

The decoding and expansion process for 1D codes works as follows. Assume that the shifting process in the serial to parallel converter 86 is being performed but that a valid code has not yet had its most significant bit shifted into the most significant bit position in the converter 86. The bit following the EOL* code in the preceding line will have caused the 1D/2D detector 126 to have enabled the 1D table 90 through the signal 1DENA* and the gate 132. The 1D table will put out a collection of output bits on the bus 110 for every cycle of the SHIFTCLK signal as a new bit pattern occurs on the address bus 94. However the 1DVALID* signal on the line 88 will not become active until the most significant bit of a valid code is shifted into the most significant bit position of the serial to parallel converter 86 and the 1D look up table recognizes it as such. At all other times the inactive state of the 1DVALID* signal will cause an inverted input or gate to which it is coupled to cause a signal on a line 142 coupled to control logic 144 to assume a state such as to cause the control logic 144 to activate the SKIP* signal on a line 146. This signal is coupled to an and gate 148 and, when activated, blocks the 1DVALID* signal from reaching the enable input of the run length latch 98.

As soon as the most significant bit of a valid 1D code is shifted into the most significant bit position of the serial to parallel converter 86, the code is recognized, and look up table 90 activates the 1DVALID* signal. This causes the control logic 144 to deactivate the SKIP signal for one cycle of the SHIFTCLK signal thereby enabling the run length latch 98. The run length data corresponding to the code so recognized is then resident on the RL bus 96 and is latched into the run length latch 98. One SHIFTCLK clock cycle later, the SKIP* signal is again activated and 1DVALID* goes inactive thereby blocking further loading of invalid run length data from the bus 96 into the run length latch 98.

The control logic 144 consists of a down counter and a flip flop in the preferred embodiment. At the time that the 1DVALID* signal is activated, the control logic loads the down counter with the value on the UCL bus 150. This data is the length of the Huffman code that the 1D table recognized as resident on the address bus 94. The purpose of the loading this count in the down counter is to cause the SKIP* signal to be activated for a predetermined time. This time is the number of SHIFBCLK cycles it takes to shift throiugh the valid code then "at the top" of the serial to parallel converter 86 to get the next valid code located at the top of the serial to parallel converter 86. Thus each cycle of the SHIFTCLK signal causes the down counter in the control logic 144 to be decremented. When the count reaches zero, the flip flop is cleared, and the 1DVALID* signal activation enables the run length latch to load the next valid run length data on the RL bus 96.

Each activation of either the 1DVALID* or the 2DVALID* signal causes the gate 99 to activate the RL BUFFER VALID signal which in turn causes the run length buffer control logic 93 to activate an RLBWR* signal on a control line 152. This causes the run length input buffer 83 to load the 1DRL run length data on a bus 156 coupling the output of the run length latch 98 to the input of the the run length input buffer 83. This run length data is used by the SEL 34 to control the expansion process to convert the run length data into an actual string of pixels of the right color and length which the original Huffman code represented.

This expansion process is done by loading the B/W* signal as one bit in the run length input buffer 83 and shifting the contents of the run length input buffer 83 into the run length output buffer 101 via the bus 157. From there, the run length data in the form of a count of the number of pixels in the run plus the color bit are loaded into a run length to document converter 164 via the bus 166. The run length to document converter 164 is a down counter which is loaded with the count from the bus 166. The down counter counts the cycles of the SHIFTCLK signal and generates an RLBDONE signal when the count reaches zero. During this counting down process, the color bit on the bus 166 is providing a constant logic one or a constant logic zero on a line 168 coupled to the input of the word alignment transfer logic (WAT) comprising the fourth and final stage of the pipeline.

The WAT 46 consists of a serial to parallel converter 170 which is a serial-in-parallel-out shift register. This shift register shifts in a constant stream of logic ones or logic zeroes in response to the cycles of the SHIFTCLK signal and depending upon the logical state of the B/W* bit on the line 168. The purpose of the serial to parallel converter is to convert the strings of logic 1's or 0's of unknown length into 16 bit words for loading into the document input buffer 172 for later writing into the RFM 22 (not shown).

The down counter of the run length to document converter 164 generates the RLBDONE signal when the count reaches zero. This signal, when active stops further counting by the down counter, and signals the run length buffer control logic 93 that the run length output buffer 101 is now free to load the next run length count from the run length input buffer 83.

The serial to parallel converter 170 also includes a 16 bit counter which counts cycles of the SHIFTCLK signal and generates the LOAD signal on the line 172 for every 16 bits which are shifted into the serial to parallel converter 170. This 16 bit counter clears itself every 16 bits and begins the count again. It serves to break the serial bit stream on line 168 into 16 bit words and load them into the document input buffer 172 as 16 bit words on the bus 174.

The purpose of the document output buffer 178 is to store the data to be loaded into the RFM 22 while a DMA document control logic 180 is contending for an RFM write cycle. The DMA document control logic 180 receives control signal on line 182 from the run length buffer control logic 93 which indicates when the document output buffer has data to send to the RFM 22. When this is true, the DMA document control 180 activates the DOCCYCRQ signal thereby requesting a write cycle request to the RFM arbitration logic (not shown). The RFM arbitration logic is conventional and its design is not critical to the invention. It purpose is to arbitrate conflicting requests for access to the RFM from the CRT controller (not shown) or other peripherals (not shown) and from the DMA document control logic 180. When the write request is granted, the RRFM arbitration logic activates the DOCCYC signal which is coupled via line 184 to the enable output port of the document output buffer 178. This causes the buffer 178 to take control of the DOCDATA output bus 186 and load the data word to be written into the RFM on said bus 186.

The address for this write transaction is supplied by the document DAM address counter 188. This counter is loaded by the CPU (not shown) at the beginning of the expansion operation via the data bus 68 (EBD) with the address for storage in the RFM of the first word of the expanded image. As is the case for loading of all registers in the expander system, the document address counter 188 is addressed for this initiation load by placing its address on the CPU address bus 190 thereby causing the CPU interface logic 60 to generate an enable signal (not shown) to enable the loading of the document DMA address counter 188. After this initial load, each time the DOCCYC signal is activated, the document DMA address counter is incremented via the line 190 coupling DOCCYC to the increment port of the counter.

The run length buffer control logic may be any design which can generate the proper signals in the proper sequence and under the proper conditions to coordinate the data transfers into the run length input buffer 83 and through the chain of logic circuits above described and into the RFM. The sequence and conditions for these transfers are as follows. The EOL* signal initializes the run length buffer control logic 93 to receive a new run length on the bus 156 for every new line coded in 2D. The condition for activation of the HOLD signal have been previously described. The run length input buffer 83 is loaded with the new run length count only after the run length input buffer has transferred its contents to the run length output buffer 101. This occurs when the count down counter in the run length to document converter 164 activates the RLBDONE signal. This indicates that enough SHIFTCLK cycles have occurred to shift in the proper number of pixels of the proper color into the serial to parallel converter 170 to make up the run length currently stored in the run length output buffer 101. This causes the run length buffer control logic 93 to activate the RLBSHFT signal to cause the run length output buffer to clock in the current contents of the run length input buffer 83 then resident on the bus 157. After this has occurred, the run length buffer control logic 93 activates the RLBWR* signal to cause the run length input buffer 83 to load the new run length count then resident on the bus 156. Transfer of data from the serial to parallel converter 170 into the document input buffer 172 occurs automatically whenever the serial to parallel converter 170 counts 16 bits that have been shifted in on the line 168. The serial to parallel converter 170 then activates the LOAD signal to cause the document input buffer 172 to load the parallel format word on the data bus 174. In some embodiments, the activation of the LOAD signal causes the document input buffer 172 to signal the control logic 93 via a control bus 191 that new data has been received and that a write cycle for the RFM is needed. This causes the DMA document control logic 180 to activate the DOCCYCRQ signal and request a write cycle. In other embodiments, the LOAD signal is coupled directly to the DMA document control logic which is typically a flip flop and causes the activation of the DOCCYCRQ signal. This signal is coupled to the load input of the document output buffer 178 and causes it to load the contents of the document input buffer then resident on the bus 193. The relative speeds of the expansion system and the video system which is accessing the RFM are such that the document output buffer will be unloaded by the activation of the DOCCYC signal before the document input buffer 172 has new data to load into the document output buffer 178.

The operation of the system in expanding two dimension coded lines is different only in the manner in which the run length code on the bus 156 is generated. Because two dimension codes are generated by reference to the previous line, it is necessary to store each line which has been expanded either from a 1D code string or a 2D code string in a reference buffer 200 for use in interpreting the 2D codes for the next line. Accordingly, as each line is expanded and the words comprising the pixel data for that line are written into the RFM, the same data is written into the reference buffer via a connection from the DOCDATA bus 186 to the data port of the reference buffer 200. The write request signal WRRQ for write cycles into the reference buffer 200 is generated by the run length buffer control logic 93 every time the DMA document control logic 180 activates the DOCCYCRQ signal. The control logic 180 is informed of this event by virtue of the coupling of the DOCCYCRQ signal via the line 202 to the control logic 180.

The activation of the WRRQ signal on the line 204 causes an arbitration logic 206 to activate a write enable signal WE* on a line 208 if there is no active read request RDRQ signal on line 210 from the 2D table. The activation of the WE* signal causes the reference buffer 200 to load the data on the DOCDATA bus 186. The address for the write transaction into the reference buffer 200 is supplied from a counter 210 which supplies sequential addresses for write cycles to store each reference line in the reference buffer 200. The counter 210 is cleared upon every activation of the EOL* signal. Each time the arbitration logic 206 activates the WE* signal, it also activates an increment signal on a line 212 to cause the counter 210 to increment to the next address for the next word on the reference line. The address outputs of the counter 210 are applied to the B input of an address multiplexer 214. The outputs of this multiplexer 214 are coupled via a bus 216 to the address ports of the reference buffer 200. When the arbitration logic activates the WE* signal, it also generates a select signal on a line 218 which causes the address multiplexer to select its B input for coupling the address bus 216.

The generation of the 2D run length count data on the bus 156 by the 2D table 92 requires a read request to the reference buffer 200 any time either a valid vertical mode code or a valid pass mode code is detected by the 2D table. When either of these types of codes are detected, the appropriate one of the output lines 220 or 222 is activated. When either of these two lines is activated, an or gate 224 activates the RDRQ signal. This causes the arbitration logic 206 to activate the CE* signal on the line which enables the reference buffer 200 and causing it to read whatever data is stored at the address on the address bus 216 and to present it on the RBD bus 230.

In the vertical mode, the run length is equal to the difference between the bit position of the last color change on the current line and the first subsequent color change on the reference line plus or minus the number of bit positions in the displacement field of the vertical code. For example, if the current bit position changed color at bit position 10 and the reference line first changed color at bit position 15 and if the vertical code is $V_r(3)$, meaning "the next current line color change is to the right of the first subsequent reference line color change by 3 bit positions", then the current line next changes color at bit position 18 or 10 +(15−10)+3. In such a case the run length would be 5+3 or 8. If the code was $V_l2$, then the next current line color change would be at bit position 13 or 10+(15−10)−2, and the run length would be 5−2 or 3.

To make this calculation, the expansion system could have any design which was capable of performing the algorithm defined above. In the preferred embodiment shown in FIGS. 2A, 2B and 2C, the calculation is performed by adding the output of a counter which counts the number of bits from the last color change on the current line to the first subsequent change of the reference line to the displacement value output from the 2D table on the DSP bus 232. The addition is done by an adder 234 which has its output coupled to the run length bus 156. The number of bit positions from the last change of color of the current line to the first subsequent change of color of the reference line is counted by the counter 236.

The counter 236 works in conjunction with a B1/B2 detector circuit 240 and select logic 242 to detect the first change in color of the reference line and to determine how many bit positions this change in color is from the last change in color in the current line. To do this it is necessary to know the location of the last change in color of the current line. This bit position is derived by the adder 244. This adder is cleared at the beginning of each new line by the EOL* signal. The adder 244 adds the current bit position as indicated by the current data on its output bus 246 to the last run length count on the bus 156. The result is the bit position in the current line of the most current color change. This bit position will be referred to as the pointer.

The pointer may or may not fall upon a word boundary for the words in the reference line stored in the reference buffer 200. To account for this fact, only the most significant 8 bits in the 12 bit pointer position number are applied to the address bus 216. These bits are designated LBD 4 through 11 in the output bus 246 of the adder 244, and they constitute the address of the word in which the pointer lies. The exact pointer position within this word is given by a bit offset number consisting of the 4 bits LBD 0 through 3 of the output bus 246 of the adder 244. These bits are applied via a bus 250 to an input of the B1/B2 detector 240, and the word containing the pixel marking the pointer position is output from the reference buffer 200 on the bus 230 and is loaded into the B1/B2 detector 240. The address multiplexer is caused by the arbitration multiplexer to select the LBD 4–11 bits at its A input each time an active RDRQ signal from the 2D table is detected.

The B1/B2 detector uses the offset bits on the bus 250 to gate the B1 output 260 and the an INCR signal on a line 262 coupled to the increment input of of the counter 236. The B1/B2 detector 240 includes a shift register (not shown) and a color change detector circuit (not shown) coupled to the serial output of the shift register which can detect when a bit shifted out of the shift register is different than the last bit shifted out of the shift register. The word on the RBD bus 230 is loaded in parallel format into the shift register, and the shift input of the shift register is coupled to the SHIFTCLK signal. The number of bits to the pointer position are then shifted out of the shift register at the rate of one every clock cycle of SHIFTCLK. The bit offset signal on the bus 250 is used to block any activations of the B1 signal during the shifting to get to the current pointer position. The bit offset signal LBD 0–3 is also used to block the generation of any INCR signal on the line 262 during the shift cycles needed to get to the current pointer position, i.e., the get the current pixel located at the pointer position to the top of the shift register and ready for shifting out to the color change detect circuitry.

When the above mentioned condition exists, the bar to activations of the B1 and INCR signals on line 260 and 262 is lifted and shifting continues. As each bit of the reference line is shifted out of the shift register, the counter 236 is incremented, and the color change detect circuitry examines the new bit to see if it represents a different color than the last bit. This process continues until the new bit does represent a different color than the last bit. When this happens in the vertical mode, the B1 signal is activated. Because the VERT signal is also active and because both B1 and VERT are coupled to an and gate 270, the and gate activates its output line 272. This line is coupled to an or gate 274 which activates the STOP CNT signal on line 276 coupled to the stop count input of the run length counter 236. The activation of the STOP CNT signal stops the run length count at the number of bits from the current pointer position to the first color change in the reference line following the current pointer position. The value of the displacement, DSP 0–3 is then added to this count by the adder 234 to derive the value of the run length.

The pass mode operates differently. In the pass mode, the pointer must be reset at the pixel position representing the second change in color of the reference line after a first change in color of the current line and before a second change in color of the current line. The current count of the run length counter 236 is then added to a zero displacement signal on the bus 232 and sent to the run length buffer 83 for expansion even though this run length is not a run from one color change to the next color change on the current line. It is a run from the current pointer position to the second color change of the *reference* line. The rest of the current line to the next color change may have been coded as another pass code, or it may have been coded as a vertical code. Regardless of what type of code was used to code the rest of the current line to the next color change, the color of the next run following a pass code will be the same color as the pass coded run. Thus circuitry (not shown) must be provided to suppress the activation of the change color signal CH COLOR between a pass code and the next code. This CH COLOR signal must be activated only after a vertical code.

The run lengths from the vertical codes and pass codes are expanded as previously described for the 1D codes in the SEL 34 and the WAT 46.

The advantages of the above described system for expanding data are that it is a data driven pipeline. Each segment of the pipeline operates substantially independently of the other stages to do it segment of processing in parallel with processing in the other stages. Thus while the ITE 24 is busy contending for the CIM and reading in new Huffman codes, previously read Huffman codes are being decoded into their run lengths and even earlier read Huffman codes are having their corresponding run lengths expanded into the actual pixel patterns which they represent. There are various protocol signals passed between stages and within the circuits of an individual stage to prevent one stage from overrunning another with new data before the subsequent stage is done processing the data it is currently processing. This high degree of parallelism reduces the amount of idle time suffered by individual stages in the pipeline and thus increases the overall processing speed of the system.

Although the invention has been described in terms of the preferred embodiment disclosed above, those skilled in the art will appreciate modifications which may be made to same without departing from the teachings of the invention. All such modifications are intended to be included within the scope of the claims appended hereto.

What is claimed is:

1. An apparatus for expanding a compression image stored as codes which define the original image pixel content comprising:
    first means for retrieving said codes;
    second means for decoding said codes into run length numbers which represent number of consecutive pixels of the same color including means for reading said codes from said first means in parallel format words which have boundaries which may or may not coincide with code boundaries and means for breaking said words at code boundaries and assembling complete codes including means for recognizing complete codes and for signalling the locations of each code's boundaries; and
    third means for converting said run lengths into strings of pixel data corresponding to the strings of pixel data in the original image which were encoded into said codes which gave rise to said run length number including a raster frame memory and means for breaking said strings of pixel data into words and for writing these words into said raster frame memory.

2. An apparatus for expanding a compression image stored as codes which define the original image pixel content comprising:
    first means for retrieving said codes;
    second means for decoding said codes into run length numbers which represent number of consecutive pixels of the same color;
    third means for converting said run lengths into strings of pixel data corresponding to the strings of pixel data in the original image which were encoded into said codes which gave rise to said run length number;
    fourth means for storing the expanded image; and fifth means for converting said strings of pixel data into data words and for writing said data into said means for storing.

3. An apparatus as defined in claim 1 further comprising control means to cause each of said first, second and third means to operate in parallel to perform their individual functions in a pipelined fashion.

4. An apparatus for expanding a compression image stored as codes which define the original image pixel content comprising:

first means for retrieving said codes;
second means for decoding said codes into run length numbers which represent number of consecutive pixels of the same color;
third means for converting said run lengths into strings of pixel data corresponding to the strings of pixel data in the original image which were encoded into said codes which gave rise to said run length number;
fourth means for storing the expanded image;
fifth means for converting said strings of pixel data into data words and for writing said data into said means for storing; and
control means to cause each of said first, second, third, fourth and fifth means to operate in parallel to perform their individual functions in a pipelined fashion.

5. An apparatus as defined in claim 3 further comprising protocol means for controlling data transfer between selected ones of said first, second and third means to prevent data loss by the writing of data from one said means to another said means before said other means has finished processing the old data stored therein and is ready to receive said new data.

6. An apparatus for expanding a compression image stored as codes which define the original image pixel content comprising:

first means for retrieving said codes;
second means for decoding said codes into run length numbers which represent number of consecutive pixels of the same color;
third means for converting said run lengths into strings of pixel data corresponding to the strings of pixel data in the original image which were encoded into said codes which gave rise to said run length number;
fourth means for storing the expanded image;
fifth means for converting said strings of pixel data into data words and for writing said data into said means for storing;
control means to cause each of said first, second, third, fourth and fifth means to operate in parallel to perform their individual functions in a pipelined fashion; and
protocol means for controlling data transfer between selected ones of said first, second, third, fourth and fifth means to prevent data loss by the writing of data from one said means to another said means before said other means has finished processing the old data stored therein and is ready to receive said new data.

7. An apparatus for expanding a compression image stored as codes which define the original image pixel content comprising:

first means for retrieving said codes;
second means for decoding said codes into run length numbers which represent number of consecutive pixels of the same color; and
third means for converting said run lengths into strings of pixel data corresponding to the strings of pixel data in the original image which were encoded into said codes which gave rise to said run length number;
wherein said first means further comprises:
means to contend for read cycles for a memory in which said codes are stored and for reading and storing data words comprised of said codes; and
means for converting said data words into said codes and for presenting them as addresses to said second means.

8. An apparatus for expanding a compression image stored as codes which define the original image pixel content comprising:

first means for retrieving said codes;
second means for decoding said codes into run length numbers which represent number of consecutive pixels of the same color; and
third means for converting said run lengths into strings of pixel data corresponding to the strings of pixel data in the original image which were encoded into said codes which gave rise to said run length number;
wherein said first means further comprises:
means to contend for read cycles for a memory in which said codes are stored and for reading and storing data words comprised of said codes; and
means for converting said data words into said codes and for presenting them as addresses to said second means; and
wherein said second means comprises:
means for receiving the address corresponding to each code and for providing data corresponding to each address from which the run lengths of pixels represented by said codes may be determined; and
means for calculating each said run length from the data provided by said means for receiving.

9. An apparatus for expanding a compression image stored as codes which define the original image pixel content comprising:

first means for retrieving said codes;
second means for decoding said codes into run length numbers which represent number of consecutive pixels of the same color; and
third means for converting said run lengths into strings of pixel data corresponding to the strings of pixel data in the original image which were encoded into said codes which gave rise to said run length number;
wherein said first means further comprises: means to contend for read cycles for a memory in which said codes are stored and for reading and storing data words comprised of said codes; and
means for converting said data words into said codes and for presenting them as addresses to said second means; and
wherein said second means comprises:
means for receiving the address corresponding to each code and for providing data corresponding to each address from which the run lengths of pixels represented by said codes may be determined; and
means for calculating each said run length from the data provided by said means for receiving;
wherein said means for receiving is a non-volatile memory which stores data at each address corresponding to a valid code the data necessary to derive the run length corresponding to said code.

10. An apparatus for expanding a compression image stored as codes which define the original image pixel content comprising:

first means for retrieving said codes;

second means for decoding said codes into run length numbers which represent number of consecutive pixels of the same color; and third means for converting said run lengths into strings of pixel data corresponding to the strings of pixel data in the original image which were encoded into said codes which gave rise to said run length number;

wherein said first means further comprises: means to contend for read cycles for a memory in which said codes are stored and for reading and storing data words comprised of said codes; and means for converting said data words into said codes and for presenting them as addresses to said second means; and wherein said second means comprises:

means for receiving the address corresponding to each code and for providing data corresponding to each address from which the run lengths of pixels represented by said codes may be determined; and means for calculating each said run length from the data provided by said means for receiving;

wherein said means for receiving is a non-volatile memory which stores at each address corresponding to a valid code the data necessary to derive the run length corresponding to said code; and wherein said third means comprises:

first buffer means for receiving each said run length and temporarily storing same and for receiving a color signal indicating for each said run length the color of pixels in the portion of the original uncompressed image to which each run length corresponds;

shifting means for receiving each said run length at a predetermined time and for shifting a number of bits representing the color of pixel represented by said run length into a shift register and for counting the number of bits shifted into said shift register and for preventing further shifting in of bits when the count equals said run length;

means for monitoring said count and for causing a new run length to be loaded into said input buffer means when said count equals the previous run length;

a document data storage buffer;

format conversion means for counting the bits as they are shifted serially into said shifting means and, when the count equals a predetermined word size, for causing the bits shifted in to be loaded in parallel format into said document data storage buffer.

11. An apparatus as defined in claimed 10 further comprising a raster frame memory for storing the data corresponding to the original image and an output data bus coupled to the data input of said raster frame memory and further comprising means for contending for write cycles to said raster frame memory, and further comprising output storage means for loading the data stored in said document data storage buffer each time a request for a write cycle is made and for loading the data so stored on said output bus every time a write cycle is granted, and further comprising means for supplying addressed to said raster frame memory corresponding to the storage locations in which said data loaded on said output bus is to be stored.

12. A method of expanding a compressed image stored as codes into another image corresponding to the original, uncompressed image comprising the steps of:

reading the codes in word format;

recognizing code boundaries within said words and signalling the locations of said code boundaries and breaking said words into said codes and converting the codes into run lengths corresponding to the length of strings of pixels of the same color in the portions of said original image corresponding to each code;

converting the run lengths into strings of data representing the proper color and size of strings of pixels at corresponding portions of said original image and assembling words out of said strings and writing said words to a display or memory;

controlling all the above steps to be done in parallel by different stages of a machine and coordinating data transfer between the stages of the machine.

13. A method of expanding a compressed image stored as codes into another image corresponding to the original, uncompressed image comprising the steps of:

reading the codes in word format;

recognizing code boundaries within said words and signalling the locations of said ode boundaries and breaking said words into said codes and converting the codes into run lengths corresponding to the length of strings of pixels of the same color in the portions of said original image corresponding to each code;

converting the run lengths into strings of data representing the proper color and size of strings of pixels at corresponding portions of said original image and assembling words out of said strings and writing said words to a display or memory;

controlling all the above steps to be done in parallel by different stages of a machine and coordinating data transfer between the stages of the machine; and further comprising the step of converting the strings of data representing pixels in the final, uncompressed image into words suitable for storage in a raster frame memory.

14. The method of claim 12 wherein the step of converting the codes into run lengths includes the steps of using each code as an address in a look up table and outputting data from which run length data may be derived for every valid code.

15. The method of claim 14 further comprising the step of outputting the run length directly from the look up table for every valid Huffman one-dimensional code.

16. A method of expanding a compressed image stored as codes into another image corresponding to the original, uncompressed image comprising the steps of:

reading the codes in word format;

recognizing code boundaries within said words and signalling the locations of said ode boundaries and breaking said words into said codes and converting the codes into run lengths corresponding to the length of strings of pixels of the same color in the portions of said original image corresponding to each code;

converting the run lengths into strings of data representing the proper color and size of strings of pixels at corresponding portions of said original image and assembling words out of said strings and writing said words to a display or memory;

controlling all the above steps to be done in parallel by different stages of a machine and coordinating data transfer between the stages of the machine;

further comprising the step of converting the strings of data representing pixels in the final, uncompressed image into words suitable for storage in a raster frame memory;

further comprising the step of outputting the run length directly from the look up table for every valid Huffman one-dimensional code; and further comprising the step of outputting the displacement data for all valid two-dimensional Huffman codes and calculating the run length by adding the displacement data to a reference number equal to the number of bits from a color change on the current raster line to the next succeeding color change on a reference raster line which just preceded said current raster line.

17. The method of claim 15 further comprising the step of calculating the reference number by updating a current pointer position upon decoding each valid two-dimensional Huffman code to the most recent color change on the current line and calculating the number of bits from the pointer position to the first subsequent color change on said reference line.

18. The method of claim 15 further comprising the step of calculating the reference number by updating said current pointer position from the position of the most current change of color on the current line to the next color change of said reference line.

19. The method of claim 18 wherein the step of converting the run lengths into strings of pixel data comprises the steps of shifting bits representing the proper color pixel for each run length into a shift register and counting the number of bits so shifted and stopping the shifting when the count equals the run length.

* * * * *